United States Patent [19]
Fujiwara et al.

[11] Patent Number: 5,920,450
[45] Date of Patent: Jul. 6, 1999

[54] MAGNETIC DISK CARTRIDGE IN WHICH FORMATION OF A GAP BETWEEN UPPER AND LOWER SHELLS IS INHIBITED

[75] Inventors: Morio Fujiwara; Nobuyuki Adachi, both of Kanagawa, Japan

[73] Assignee: Fuji Photo Film Co., Ltd., Kanagawa-Ken, Japan

[21] Appl. No.: 08/131,376

[22] Filed: Oct. 5, 1993

[30] Foreign Application Priority Data

Oct. 13, 1992 [JP] Japan .................................. 4-077175 U

[51] Int. Cl.⁶ .................................................. G11B 23/03
[52] U.S. Cl. ............................................................ 360/133
[58] Field of Search ................................ 360/133, 132; 369/291

[56] References Cited

U.S. PATENT DOCUMENTS

| | | | |
|---|---|---|---|
| 4,814,927 | 3/1989 | Iwamoto et al. ........................ | 360/133 |
| 4,943,880 | 7/1990 | Muehlhausen et al. ................. | 360/133 |
| 5,081,556 | 1/1992 | Ikebe et al. ............................. | 360/133 |

*Primary Examiner*—William R. Korzuch
*Attorney, Agent, or Firm*—Sughrue, Mion, Zinn, Macpeak & Seas, PLLC

[57] ABSTRACT

A magnetic disk cartridge in which the formation of a gap in the end faces of a rear portion of a magnetic disk cartridge is prevented without increasing the size of the welded portion of the cartridge. Each of upper and lower shells, which are used to construct the case of the magnetic disk cartridge, includes a plurality of thick portions extending substantially along the rear edge of the case and disposed substantially symmetrically with respect to each other with a center line therebetween, the central line intersecting perpendicularly the rear edge of the case. Before the upper and lower shells are assembled together, the rear edges of the case are thereby curved so as to cause the inner surface sides of the respective shells to bow inwardly.

4 Claims, 6 Drawing Sheets

MAGNETIC DISK CARTRIDGE IN WHICH FORMATION OF A GAP BETWEEN UPPER AND LOWER SHELLS IS INHIBITED

BACKGROUND OF THE INVENTION

The present invention relates to a magnetic disk cartridge and, more particularly, to a magnetic disk cartridge which prevents the formation of a gap between upper and lower shells in the rear end portion of the cartridge case.

Generally, a 3.5-inch micro floppy disk (hereinafter referred to as a 3.5-inch MFD) includes a cartridge case composed of upper and lower shells, a magnetic disk rotatably received within the case, and a liner and a lifter for pressing the liner toward the magnetic disk and disposed on the inner wall surface of the case. A window is formed in the cartridge case for recording and reproduction from the magnetic disk. A shutter is slidably fitted to the outside of the case for opening and closing the window. The cartridge case, which is generally square in shape, is normally formed by upper and lower shells formed of synthetic resin placed in opposition to one another, with respective corner portions of the case spot welded to one another to thereby form an integral structure.

In the conventional magnetic disk cartridge, in order to facilitate production and to improve the overall structure of the cartridge, the sides 1, 2, 3 and 4, which are the abutted portions of the peripheral edges of the upper shell A (FIG. 11) and the lower shell B (FIG. 12), are not welded together along their entire lengths, but only the corner portions thereof are welded together. That is, in the upper and lower shells A and B shown in FIG. 11 and 12, after a liner and the like (not shown) are mounted to each of the shells and a magnetic disk is placed between the upper and lower shells A and B, welding projections $a_1$ and $a_2$, $b_1$ and $b_2$, $c_1$ and $c_2$, and $d_1$ and $d_2$, which are formed in the respective corner portions of the upper and lower shells A and B in respective opposing positions, are abutted against each other simultaneously as the upper and lower shells are accurately superimposed on each other, and the welding projections are then welded together using ultrasonic welding.

Figure 11:
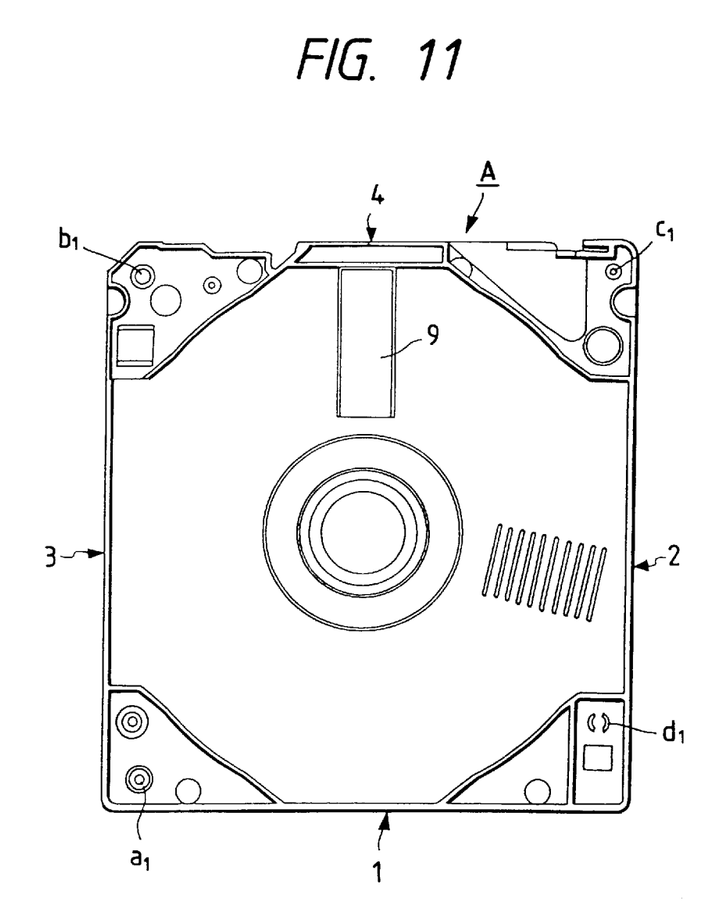
FIG. 11 is a plan view of an upper shell employed in a conventional magnetic disk cartridge.
Figure 12:
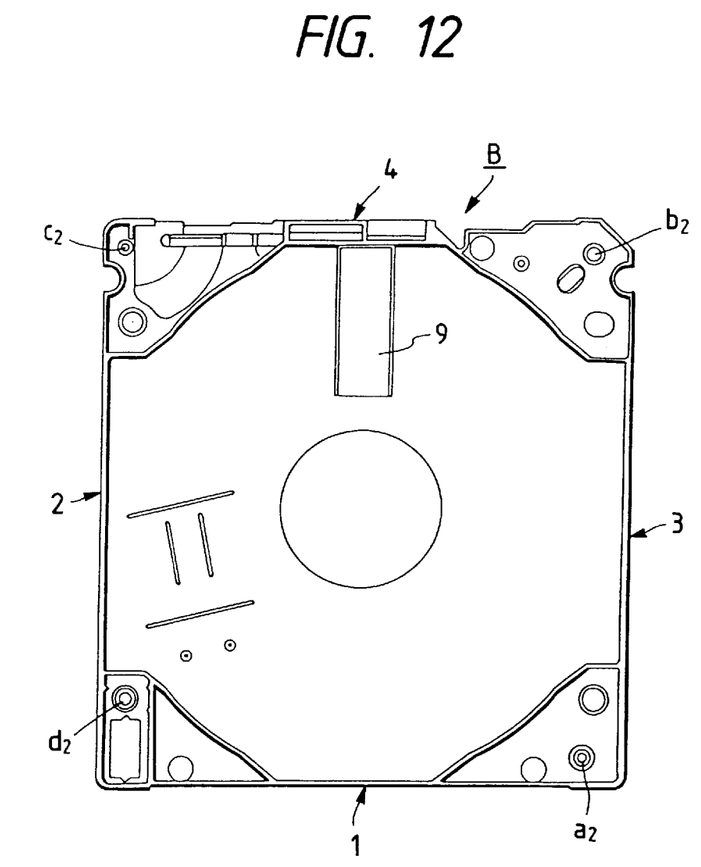
FIG. 12 is a plan view of a lower shell paired with the upper shell shown in FIG. 11.

As described above, due to the fact that the entirety of the case peripheral edges are not welded, there is a possibility that a small gap can be formed between the unwelded portions between the upper and lower shells A and B. Especially there is a marked tendency of such a gap occurring in the case rear portion (on the side opposite the window 9) where the shutter is not present.

When the atmospheric air is dry, the amount of static electricity charge carried by a user can be quite high. Under such conditions, when the user touches the cartridge in order to load or unload the cartridge, the static electric can be discharged between the user's hand and the magnetic disk through the gap between the shells, which can damage the magnetic disk or cause dielectric breakdown of the insulation of the wires of a magnetic head. Also, if dust or other foreign matter enters through the gap, the rotating magnetic disk can be damaged.

On the other hand, if the entire peripheries of the shells are welded together in order to prevent the above-mentioned problems, the welded peripheries can be distorted due to the expansion and contraction thereof caused by varying temperatures, which can twist the whole of the cartridge, with the result that the cartridge cannot be loaded accurately.

In view of the above-mentioned problems, in Japanese Utility Model Publications Nos. Sho. 60-180377 and 62-42172, there is disclosed a cartridge in which at least the vicinity of the central portion of the rear edge portion of the case or substantially the whole of the rear edge portion is welded. However, it has been found that it is difficult to precisely balance the welded portions, a gap can easily be formed in the right and left sides of the case which are not welded, the case is easily distorted due to temperature changes, and the welding operation is often difficult to control.

SUMMARY OF THE INVENTION

It is an object of the present invention to eliminate the problems found in the above-mentioned conventional magnetic disk cartridges. Accordingly, it is an object of the invention to provide a magnetic disk cartridge of high quality which can prevent a gap from being formed between the rear portions of the upper and lower shells without employing welding over a large area, and which also can prevent the welding from varying or being unstable.

In achieving the above object, according to the invention, there is provided a substantially square-shaped magnetic disk cartridge including a cartridge case constructed by superimposing upper and lower shells formed of synthetic resin, a disk-shaped recording medium rotatably received within the cartridge case, and a shutter for slidably opening and closing a window formed in the cartridge case, in which, with the side of the case where the window is formed being taken as the front portion thereof and the opposite side as the rear portion thereof, each of the upper and lower shells includes a plurality of thick portions extending substantially along the rear edge portion of the case, with the thick portions being disposed substantially symmetrically with respect to each other about a center line intersecting perpendicularly the rear edge of the case, and the upper and lower shells are constructed in such a manner that the rear edge portions thereof are curved so as to expand the shell inner surface sides before the upper and lower shells are assembled.

DESCRIPTION OF THE PREFERRED EMBODIMENTS

A description will be given hereinbelow of preferred embodiments of the invention with reference to the accompanying drawings. In FIGS. 3 to 10, there are shown preferred embodiments according to the invention. In the illustrated embodiments, description will be given of a 3.5-inch MFD.

Figure 3:
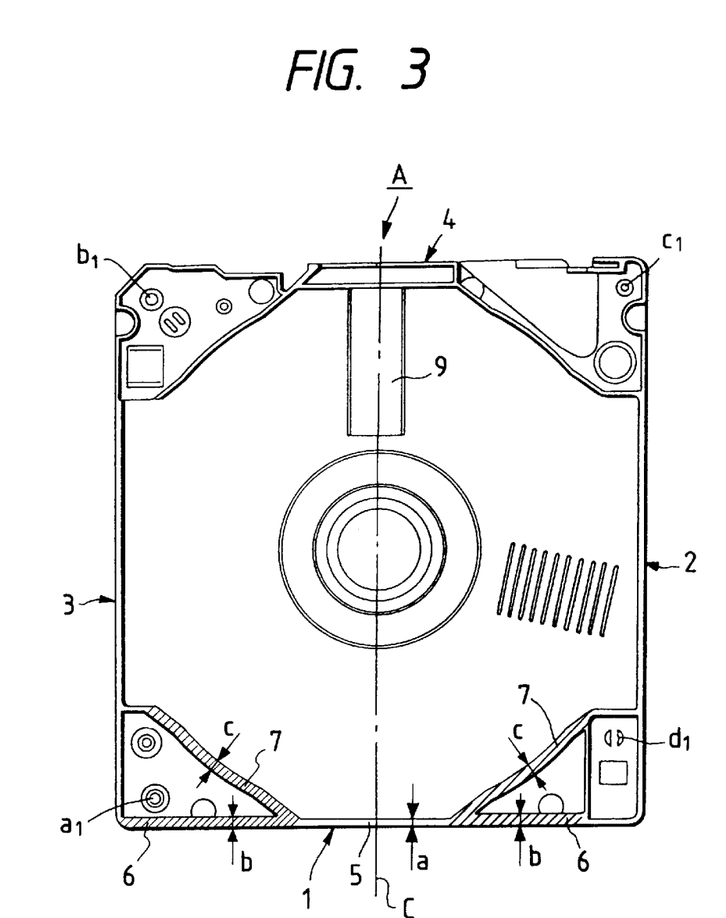
FIG. 3 is a plan view of an upper shell employed in an embodiment according to the invention.
Figure 4:
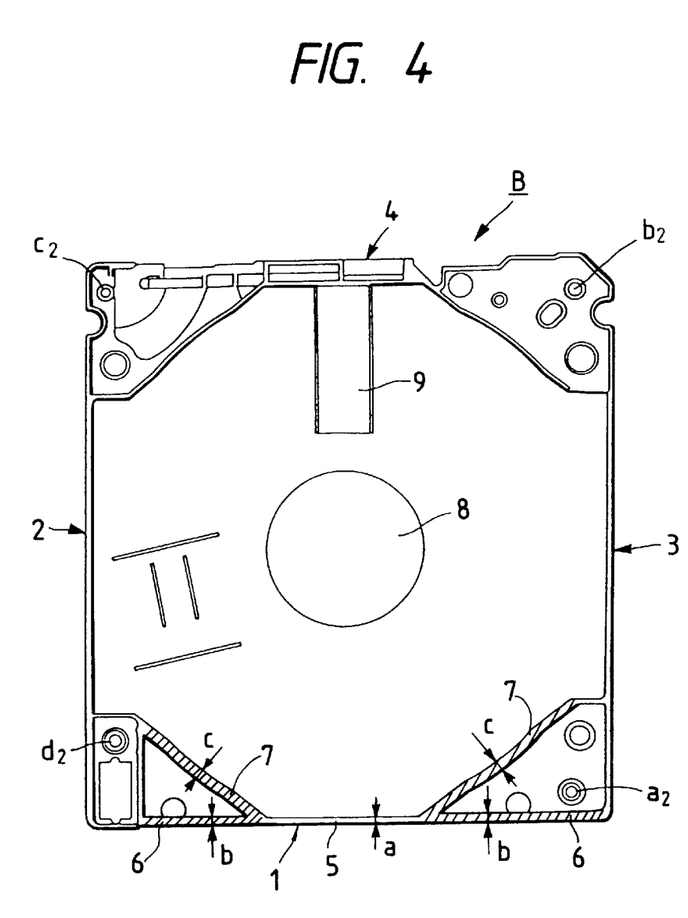
FIG. 4 is a plan view of a lower shell paired with the upper shell shown in FIG. 3.

In FIG. 3, there is shown a plan view of the interior of an upper shell A, while in FIG. 4 there is shown a plan view of the interior of a lower shell B. The upper shell A and lower shell B are respectively formed in a square shape including a rear side 1, a front side 4, a left lateral side 2, and a right lateral side 3, which form the abutting portions of the shells. In the upper and lower shells A and B, an outer peripheral rib and other ribs which form the respective sides 1, 2, 3 and 4 are formed symmetrically with respect to each other. The upper and lower shells are disposed face to face, and are then superimposed on each other, thereby to be combined into a integral case.

After an unwoven cloth is bonded to the interiors of the upper and lower shells A and B, a magnetic disk in the form of an annularly shaped magnetic sheet is rotatably disposed in the cartridge case. The lower shell B includes a circular hole 8 which exposes to the outside the surface of a center core bonded to the center hole of the magnetic disk.

Figure 1:
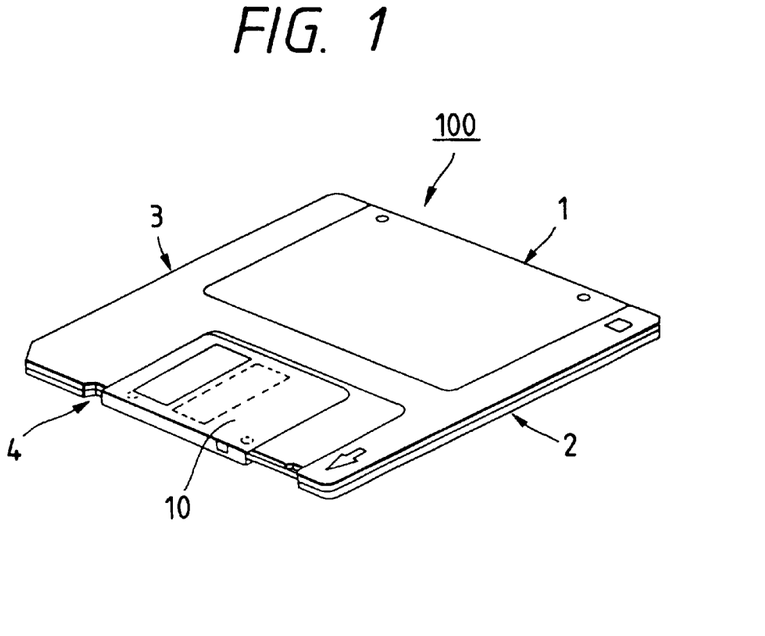
FIG. 1 is a perspective view of a magnetic disk cartridge constructed according to the invention.

After the magnetic disk is placed in the case, pairs of welding projections $a_1$ and $a_2$, $b_1$ and $b_2$, $c_1$ and $c_2$, and $d_1$ and $d_2$, which are respectively opposed to each other and are provided in the respective corners of the upper and lower shells A and B, are abutted against each other while the upper and lower shells A and B are accurately superimposed on each other, and then the welding projections are connected to each other by ultrasonic welding. As shown in FIG. 1, a shutter 10, which is used to open and close a window 9 (FIGS. 3 and 4) for recording and reproduction is slidably mounted on the front portion side 4 to thereby complete the magnetic disk cartridge 100.

The present invention is characterized in that each of the upper and lower shells A and B includes a plurality of thick portions 6, 7, 11 and 12 extending substantially along the side 1, namely, the rear edge portion of the shell. The thick portions are disposed substantially symmetrically about a center line C intersecting perpendicularly the rear side 1. In the present embodiment, as shown in FIGS. 3 and 4, the two rib side areas 6 (indicated by hatching) of the rear side 1 and inclined ribs 7 (also indicated by hatching), extending obliquely across the two side areas 6 and inwardly of the case, extend widely about the center line C. Due to this structure, after the upper and lower shells A and B are injection molded and before the upper and lower shells are assembled by welding, the portion of each of the shells extending along the rear edge of the case is curved so as to cause the inner surface side of the rear portion of the shell to bow inward toward the opposing shell.

That is, when the shells A and B are formed by an automatic molding machine or the like, a slight curved distortion is produced in the central portion of the rear side 1 of each of the shells so that the sides 1 bow slightly inward in an arc. For this reason, when the two curved shells are superimposed on each other so as to form the case, at first only the central portions contact each other in the rear portion of the case as the two sides of each of the central portions are slightly bowed toward one another.

In this connection, as described above, when the upper and lower shells A and B are superimposed on each other and the welding projections are connected to each other by ultrasonic welding, there is left a distortion stress in the rear side 1 of the case due to the shell's curved distortion, which distortion stress increases toward the central portion of the side 1. As a result, the upper and lower shells are strongly pressed against each other in the respective rear portions in such a manner that the pressing force increases toward the central part of the rear portion of the case. As a result, no gap is formed in the rear end surface of the magnetic disk cartridge. This eliminates the above-described problems of the conventional magnetic disk cartridge.

In the structure shown in FIGS. 3 and 4, of the four sides forming the outer periphery of the case, the width of the rib (here, width refers to the wall thickness) of the rear side 1 of each of the shells A and B is set as follows. With respect to the width a of the rib central area 5 situated in the central portion of the side 1, which occupies 45% or less of the entire length of the side 1, the widths b of the rib side areas 6 adjoining the rib central area 5 and the widths c of the inclined ribs 7 are at least 20% greater than the width a of the rib central area 5 so as to generate a curve effectively.

However, the above-mentioned widths b and c are not specifically limited, and the material of the shell can be selected according to various conditions such as the thickness of the shell, and the size, structure and the like of the magnetic disk cartridge.

A comparison test was conducted as to the formation of a gap in a shell structure constructed according to the present embodiment and in other different shell structures. The results of these tests are shown by a bar graph in FIG. 2.

Figure 2:
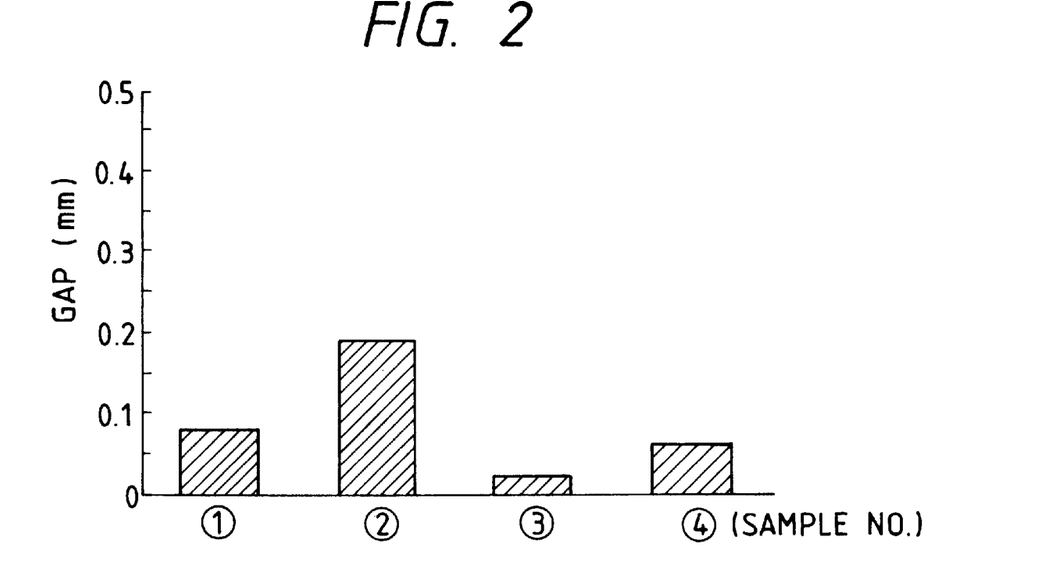
FIG. 2 is a bar graph representation of test results used to compare the extent of generation of a gap in a shell according to the invention with that of a shell having other shapes.

Referring to FIG. 2, Sample No. ① is a conventional type shell structure as shown in FIGS. 11 and 12, Sample No. ② is a shell structure in which the rib central area 5 has a large thickness (that is, the width thereof is increased), Sample No. ③ is a shell structure according to the embodiment shown in FIGS. 3 and 4, and Sample No. ④ is a shell structure in which the rib central area 5, two side areas 6 and inclined ribs 7 are increased in width. Referring to the curves of the individual shells, a curve which expands toward the outside of the case is referred to as a positive curve, while a curve expanding in the opposite direction is referred to as a negative curve. The upper shell tends to be curved about 20% more than the lower shell because the upper and lower shells are slightly different in structure.

In Sample No. ①, the curves of the upper and lower shells were measured separately. The average measured value of the upper shell was about 0 $\mu$m, while the average value for the lower shell was +20 $\mu$m. When the upper and lower shells were welded together, the average gap width was 80 $\mu$m.

For Sample No. ②, the average measured value of the upper shell was almost +90 $\mu$m, while the average value for the lower shell was +8 $\mu$m. When the upper and lower shells were welded together, the average gap width was 190 $\mu$m, that is, the size of the gap increased (made worse) compared with the conventional shells.

For Sample No. ④, the average measured value of the upper shell was almost +90 $\mu$m, while the average value of the lower shell was +70 $\mu$m. When the upper and lower shells were welded together, the average gap width was 60 $\mu$m, that is, the size of the gap was slightly improved compared with the conventional shells.

In Sample No. ③, the average measured value of the upper shell was about −40 $\mu$m, while the average value of the lower shell was −50 $\mu$m. When the upper and lower shells were welded together, the average gap width was 20 $\mu$m, that is, the gap size was greatly improved compared with the conventional shells.

Next, a description will be given of another embodiment of the lower shell B.

Figure 5:
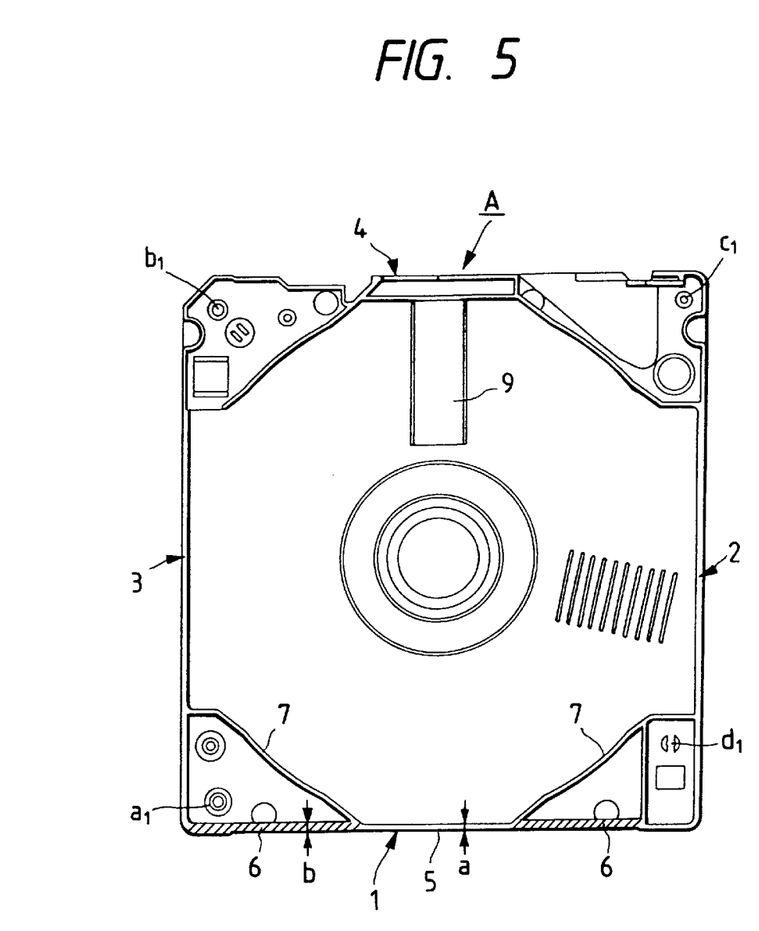
FIG. 5 is a plan view of an upper shell employed in another embodiment according to the invention.
Figure 6:
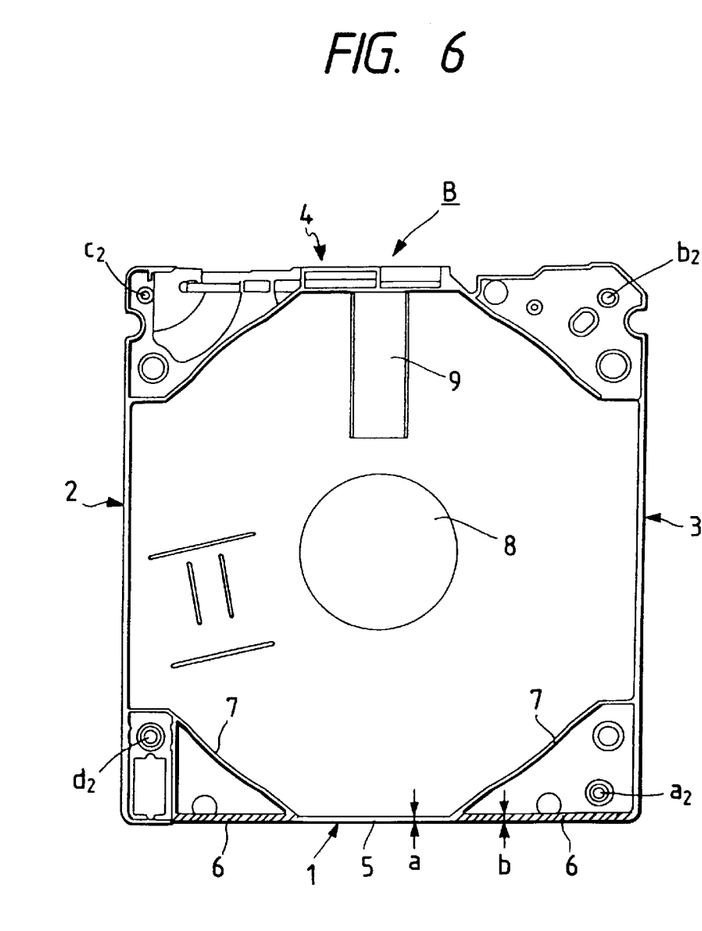
FIG. 6 is a plan view of a lower shell paired with the upper shell shown in FIG. 5.

FIGS. 5 and 6 illustrates a second embodiment of a magnetic disk cartridge, which differs from the first embodiment only in that the widths b of the ribs 6 (indicated by hatching) are made greater than the width a of the rib central area 5, similar to the first embodiment. In this case, no gap at all was formed between the rear end surfaces of a cartridge case formed by the two shells.

In this case as well, when the upper and lower shells A and B are welded to each other to assemble a case similar to the embodiment shown in FIGS. 3 and 4, then in the cartridge case formed by upper and lower shells A and B that are respectively curved, there are left distortion stresses in the two directions at the center of the rear portion of the case, with the result that the upper and lower shells A and B are pressed against each other in the rear portion edges thereof. For this reason, even if no special measures to widen the welding area are taken, there is eliminated the possibility that a gap can be formed between the upper and lower shells in the rear surfaces of the case.

Figure 7:
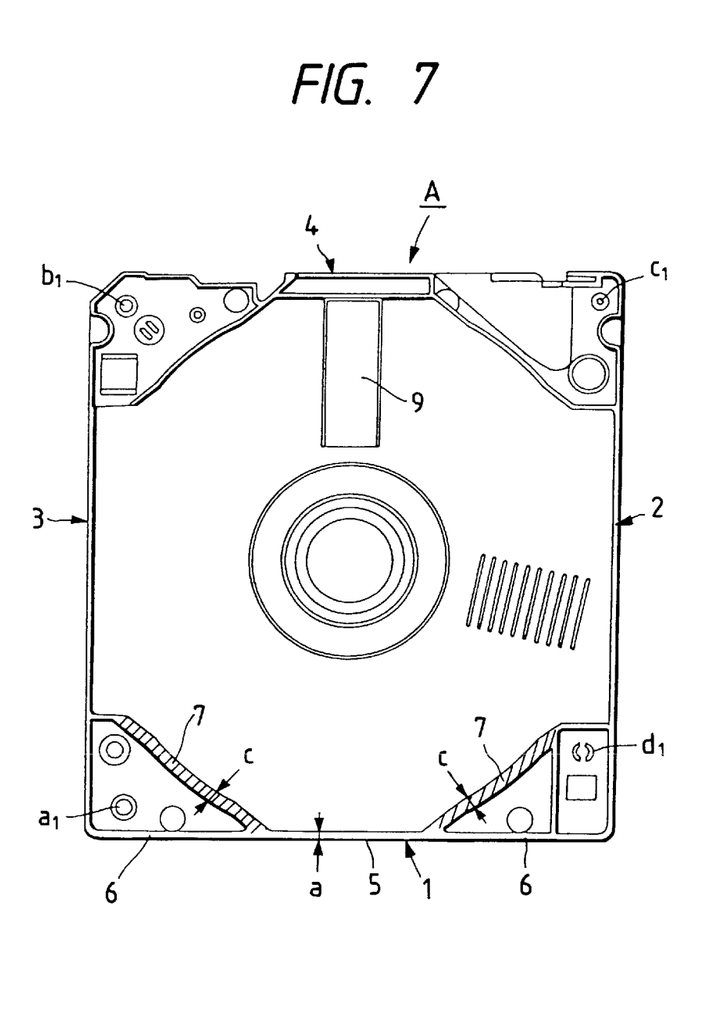
FIG. 7 is a plan view of an upper shell employed in still another embodiment according to the invention.
Figure 8:
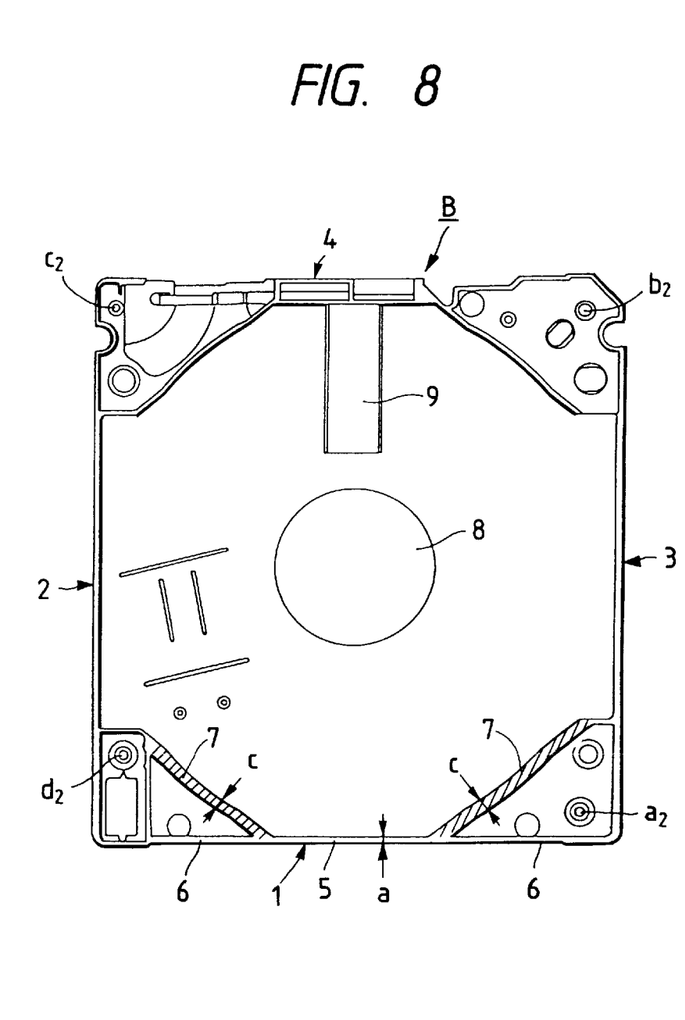
FIG. 8 is a plan view of a lower shell paired with the upper shell shown in FIG. 7.

In FIGS. 7 and 8 there is shown a third embodiment of a magnetic disk cartridge according to the invention. This cartridge is basically the same as that of the first embodiment, differing therefrom only in that the widths c of the ribs 7 (indicated by hatching) are made greater than the width a of the rib central area 5. In the third embodiment as well there is eliminated the possibility that a gap will be formed in the rear surfaces of the cartridge case.

Figure 9:
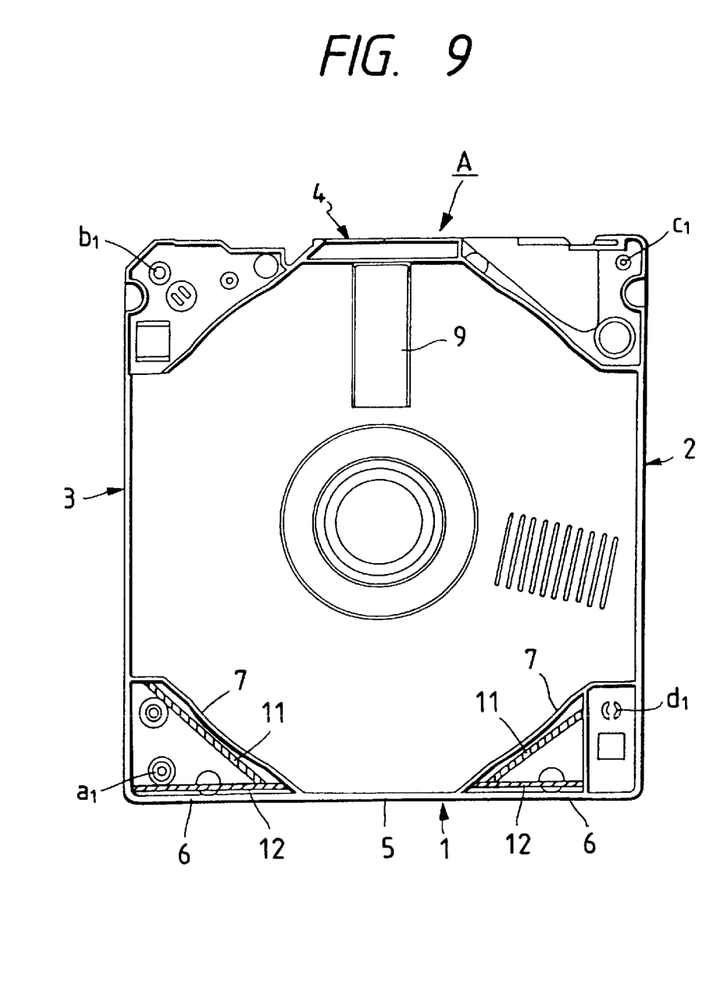
FIG. 9 is a plan view of an upper shell employed in yet another embodiment according to the invention.
Figure 10:
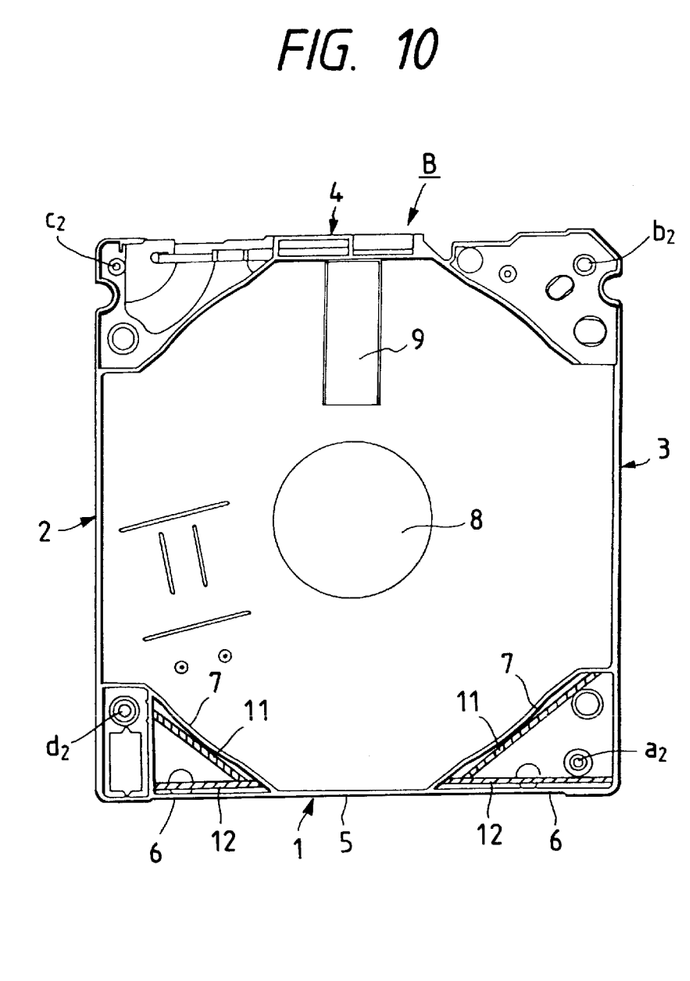
FIG. 10 is a plan view of a lower shell paired with the upper shell shown in FIG. 9.

In FIGS. 9 and 10, there is shown a fourth embodiment of a magnetic disk cartridge according to the invention. The fourth embodiment is similar to the first embodiment, but differs therefrom in that the widths of the ribs corresponding to the two side areas 6 and inclined ribs 7 respectively employed in the first embodiment are the same as the width a of the rib central area 5, and also in that, as indicated by hatching in FIGS. 9 and 10, further ribs 11 and 12 are provided at positions spaced apart from and inside the ribs 6 and 7 to thereby form thick portions each having an inclined V shape. The fourth embodiment may be constructed independently but, alternatively, it may be constructed in combination with any one of the embodiments shown in FIGS. 3 and 8.

Also, the shapes of the thick portions in the present invention are not limited to those employed in the discussed embodiments, but may be changed variously in the number, shape and the like thereof, provided that the thick portions are not substantially connected to each other with the center line C between them.

The above-described embodiments have been discussed with reference to a 3.5-inch MFD. However, the present invention is not so limited and can also be widely applied to magnetic disk cartridges of other sizes, an optical magnetic disk cartridge, and the like.

As has been described heretofore, according to the invention, due to the fact that each of the upper and lower shells includes a plurality of thick portions extending along the rear edge portion of the case, and the thick portions are disposed substantially symmetrically with respect to each other with a central line therebetween, which central line intersects the rear edge of the case, there are left distortion stresses extending in two directions from the center of the rear portion of the case. As a result, the upper and lower shells are pressed against each other at the edge sides of the rear portions of the case, and, for this reason, even if no special measures are taken to widen the welding area, there is eliminated the possibility that a gap will be formed between the upper and lower shells. This prevents the occurrence of problems caused by static electricity, as often occur in the conventional magnetic disk cartridge, and also prevents problems caused by intrusion of fine dust particles.

What is claimed is:

1. In a magnetic disk cartridge of a substantially square shape comprising a cartridge case formed by superimposingly combining opposed upper and lower shells formed of synthetic resin, a disk-shaped recording medium rotatably received within said cartridge case, and a shutter for slidably opening and closing a window formed in said cartridge case, the improvement wherein said upper and lower shells each include a plurality of ribs respectively extending substantially symmetrically with respect to each other with a central line therebetween, said central line intersecting a rear edge of said case, said upper and lower shells having distortion stresses in a rear edge portion of each of said upper and lower shells before said upper and lower shells are combined together due to said ribs, said rear edge portions of said upper and lower shells bow toward the opposing shell, wherein formation of a gap between said upper and lower shells along said rear edge is inhibited when said upper and lower shells are combined together, wherein said ribs comprise at least one of two end portions of a side wall rib extending along said rear edge of said case and a pair of inclined ribs extending adjacent respective edge portions of said disk-shaped recording medium, and further wherein a center portion of said side wall rib between said two end portions thereof occupies no more than 45% of the entire length of said side wall rib, and wherein a thickness of said two end portions of said side wall rib and a thickness of said pair of inclined ribs is at least 20% greater than a thickness of said center portion of said side wall rib.

2. In a magnetic disk cartridge of a substantially square shape comprising a cartridge case formed by superimposingly combining opposed upper and lower shells formed of synthetic resin, a disk-shaped recording medium rotatable received within said cartridge case, and a shutter for slidably opening and closing a window formed in said cartridge case, the improvement wherein said upper and lower shells each include a plurality of ribs respectively extending substantially symmetrically with respect to each other with a central line therebetween, said central line intersecting a rear edge of said case, said upper and lower shells having distortion stresses in a rear edge portion of each of said upper and lower shells before said upper and lower shells are combined together due to said ribs, said rear edge portions of said upper and lower shells bow toward the opposing shell, wherein formation of a gap between said upper and lower shells along said rear edge is inhibited when said upper and lower shells are combined together, wherein said ribs comprise two end portions of a side wall rib extending along said rear edge of said case, and further wherein a thickness of said two end portions of said side wall rib is greater than a thickness of said center portion of said side wall rib.

3. In a magnetic disk cartridge of a substantially square shape comprising a cartridge case formed by superimposingly combining opposed upper and lower shells formed of synthetic resin, a disk-shaped recording medium rotatable received within said cartridge case, and a shutter for slidably opening and closing a window formed in said cartridge case, the improvement wherein said upper and lower shells each include a plurality of ribs respectively extending substantially symmetrically with respect to each other with a central line therebetween, said central line intersecting a rear edge of said case, said upper and lower shells having distortion stresses in a rear edge portion of each of said upper and lower shells before said upper and lower shells are combined together due to said ribs, said rear edge portions of said upper and lower shells bow toward the opposing shell, wherein formation of a gap between said upper and lower shells along said rear edge is inhibited when said upper and lower shells are combined together, wherein said ribs comprise a pair of inclined ribs extending adjacent respective edge portions of said disk-shaped recording medium, and further wherein a thickness of said pair of inclined ribs is greater than a thickness of a side wall rib extending along said rear edge of said case.

4. In a magnetic disk cartridge of a substantially square shape comprising a cartridge case formed by superimposingly combining opposed upper and lower shells formed of synthetic resin, a disk-shaped recording medium rotatable received within said cartridge case, and a shutter for slidably opening and closing a window formed in said cartridge case, the improvement wherein said upper and lower shells each include a plurality of ribs respectively extending substantially symmetrically with respect to each other with a central line therebetween, said central line intersecting a rear edge of said case, said upper and lower shells having distortion stresses in a rear edge portion of each of said upper and lower shells before said upper and lower shells are combined together due to said ribs, said rear edge portions of said upper and lower shells bow toward the opposing shell, wherein formation of a gap between said upper and lower shells along said rear edge is inhibited when said upper and lower shells are combined together, and further wherein said ribs comprise a symmetric pair of ribs, one of which is parallel to and spaced from a side wall rib extending along said rear edge of said case, and the other of which is parallel to and spaced from an inclined rib extending adjacent an edge portion of said disk-shaped recording medium.

* * * * *